Jan. 13, 1953     M. F. PETERS     2,625,588
APPARATUS FOR MEASURING POTENTIAL DIFFERENCES IN LIQUID
Filed May 23, 1952
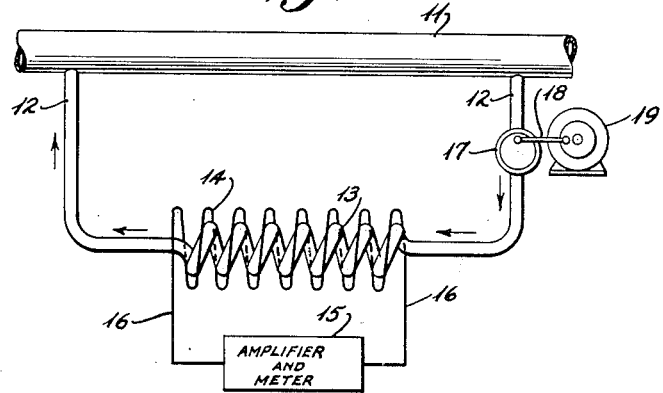
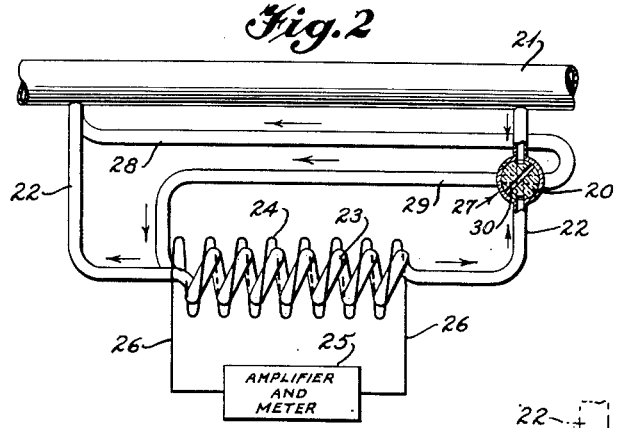
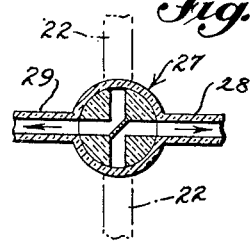
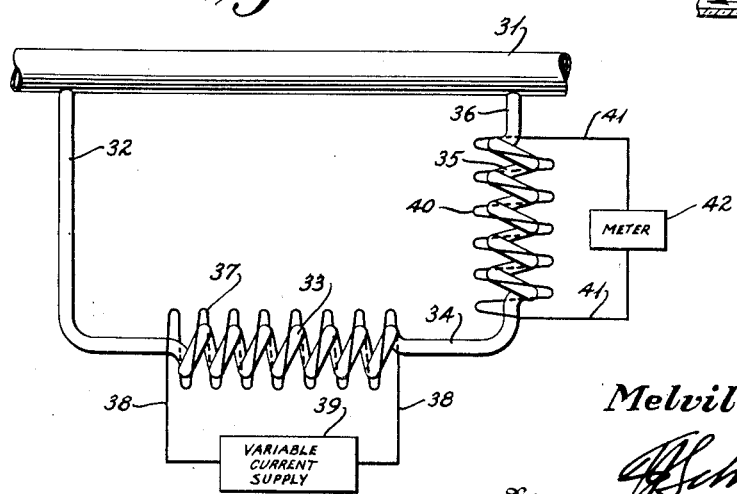
Inventor
Melville F. Peters

Patented Jan. 13, 1953

2,625,588

UNITED STATES PATENT OFFICE 2,625,588

APPARATUS FOR MEASURING POTENTIAL DIFFERENCES IN LIQUID

Melville F. Peters, Essex County, N. J.

Application May 23, 1952, Serial No. 289,463

11 Claims. (Cl. 175—183)

1

The present invention relates to an apparatus for measuring an electric potential difference in a liquid and is a continuation-in-part of my copending application Serial No. 164,164, filed May 25, 1950.

More particularly the invention relates to an apparatus for measuring the electric potential difference across two points in a body of electrolytic liquid without utilizing any probes or electrodes thereby eliminating entirely any chemical interaction between the electrodes and the liquid.

The prior art practice in measuring the electric potential difference across two points in a body of liquid has been to insert a pair of probes at the respective points and to connect the probes to opposite ends of an electrical indicating device, such as a conventional voltmeter or ammeter. This arrangement has produced a chemical interaction between the probes and the liquid, the so-called galvanic action, which disrupts the chemical composition of the liquid and produces highly erroneous results in the measurement of the potention difference.

Certain of these errors and disadvantages may be eliminated by the judicious selection of the material utilized for the probes or electrodes. However, this expedient can not entirely remove the errors, and also limits the application of the measuring apparatus to specified liquids.

The present invention proposes to eliminate these and other disadvantages of the prior art by eliminating the use of any probes or electrodes. In general, the present invention provides an auxiliary path for the liquid, the flow of electrons across this auxiliary path being variable. Coupled to this auxiliary path is an electromagnetic device, such as a coil, which has induced therein an electromagnetic force, the magnitude of this force being indicative of the electric potential difference existing across the liquid.

Accordingly, it is an object of the present invention to provide an apparatus for measuring the electric potential difference existing across a liquid without employing any probes or electrodes.

Another object is to provide an apparatus for producing an electromotive force proportional to the electric potential existing across two points in a body of liquid.

A further object is to provide a method and apparatus for producing a variable electric current from the potential difference existing across two points in a body of liquid without altering the chemical composition of the liquid.

The exact nature of this invention as well as other objects and advantages thereof will be readily apparent from consideration of the following specification relating to the annexed drawing in which:

Fig. 1 is a front elevational view of one embodiment of the present invention for measuring the electric potential difference across a body of liquid;

Fig. 2 is a front elevational view, partly in section, of another embodiment of the present invention;

Fig. 3 is a rear sectional view of the valve of Fig. 2, illustrating one operative position of the valve; and Fig. 4 is a front elevational view of still another embodiment of the invention.

Referring now to the drawings, wherein like reference characters designate like or corresponding parts throughout the several views, there is shown in Fig. 1 a fluid conduit 11 in which is located a liquid having an electrical potential difference thereacross. Communicating with conduit 11 at the respective points across which the potential difference is to be measured is a pair of fluid conduits 12 connected together by means of a conduit 13, helically shaped in the form of a coil, conduits 12 and 13 being of insulating material, such as glass or any suitable plastic.

Encircling and coaxial with conduit 13 is an electromagnetic device, such as a coil 14, opposite ends of coil 14 being connected across an electrical indicating circuit, preferably comprising an amplifier and a potential indicating device 15, by means of electrical leads 16. Coil 14 is preferably closely coupled to conduit 13 in order to increase the sensitivity of the apparatus, although it is to be understood that the apparatus would be operative even if conduit 13 were replaced by a tubular conduit similar to conduit 12.

Inserted in either of conduits 12 is a valve 17, which may be simple stop cock or any other suitable unidirectional valve. Operatively connected to valve 17 by means of any suitable linkage 18 is a motor 19, motor 19 being effective to continuously reciprocate valve 17 to thereby continuously open and close conduit 12.

In operation, upon reciprocation of valve 17, the circuit across conduit 13 will experience a pulsating direct current due to the difference in electrical potential existing across conduit 11. In the embodiment of Fig. 1 it is assumed that the point at the right-hand side of the drawing is at the higher potential, and the direction of flow of current through conduits 12 and 13 is indicated by the arrows. This pulsating current in conduit 13 will induce an electromotive force in coil 14 which is then amplified and indicated by circuit 15, this indication being proportional to the electric potential difference existing across the liquid in conduit 11.

It is to be understood, of course, that the means shown for operating valve 17 is merely illustrative, and that valve 17 may be operated, manually, hydraulically or electrically without departing from the spirit and scope of the present invention. It is also apparent that valve 17 need not be reciprocated, but could be continuously rotated without disrupting the operation of the present invention. The rate of flow of liquid through conduit 13 need only be great enough to maintain constant the chemical composition and the temperature of the liquid.

Referring now to Fig. 2, which illustrates another embodiment of the present invention, conduits 21, 22 and 23, coil 24, circuit 25 and leads 26 are identical with the corresponding elements of Fig. 1. In this embodiment, however, valve 27 is a multiple position valve, the front section of which is illustrated in closed position in Fig. 2. Movement of the rotatable inner section 20 of valve 27 a small amount counterclockwise will align conduit 30 of section 20 with opposite ends of conduit 22 to thereby open the fluid path from right to left between conduits 22 and 23.

The rear section of valve 27 is in the open position illustrated in Fig. 3 at the moment the front section is in the closed position illustrated. As shown in Figs. 2 and 3, the fluid flow path through the rear section is continuous between the upper end of right-hand conduit 22, valve 27, conduit 29, conduit 23, the lower end of right-hand conduit 22, valve 27, conduit 28, and left-hand conduit 22, the direction of flow being indicated by the arrows.

It is thus seen that the embodiment of Figs. 2 and 3 produces an alternating current, rather than the pulsating direct current produced by the embodiment of Fig. 1, valve 27 being reciprocated by any suitable mechanism, such as that illustrated in Fig. 1. This alternating current induces an electromotive force in coil 24, which is then amplified and indicated by circuit 25.

It is to be understood, of course, that the valve disclosed in Figs. 2 and 3 is merely illustrative, and that any other suitable form of compound valve may be utilized for producing the alternating current. The number of sections of the valve may be increased to increase the frequency of the alternating current, and the valve may be made rotatable rather than reciprocable.

The form of the invention shown in Fig. 4 utilizes electrical means, for varying the election flow in the auxiliary passage rather than the mechanical means shown in Figs. 1 through 3. The main fluid conduit in this form of the invention is illustrated by the reference character 31, in which is located a liquid having an electrical potential difference thereacross. The auxiliary fluid flow path comprises conduits 32, 33, 34, 35 and 36. Conduits 33 and 35 are helically shaped in the form of a coil and are constructed of an insulating material such as glass or any suitable plastic.

Encircling and coaxial with helical conduit 33 is an electromotive device, such as a coil 37, opposite ends of coil 37 being connected by electrical leads 38 to a variable current power supply 39. This variable current supply may be in the form of a pulsating direct current or an alternating current. Encircling and coaxial with helical coil 35 is an electromotive device, such as coil 40, opposite ends of coil 40 being connected by electrical leads 41 to an indicating meter 42.

Assuming that the auxiliary passage formed by conduits 32, 33, 34, 35 and 36 are filled with a liquid having the same chemical composition and temperature as the liquid in the main conduit 31 and that a voltage potential $V_1$ exists where conduit 36 enters one end of conduit 31 and a lower voltage potential $V_2$ exists where conduit 32 enters the other end of conduit 31, a difference in potential $V_1-V_2$ will exist across conduit 31. If an alternating current is passed through coil 37, an E. M. F. will be induced in the liquid in helical conduit 33. The potential of the liquid during one-half cycle will add to the induced E. M. F. and during the other half cycle will be subtracted therefrom. This will produce a pulsating or alternating current in the auxiliary path fluid, depending on the amplitude of the applied E. M. F. and the potential of the liquid in the helical conduit. The amplitude of the applied E. M. F. may be made sufficiently large to produce an alternating E. M. F. or may be smaller to produce a pulsating E. M. F. This changing current in conduit 35 will induce an E. M. F. in coil 40 which may be recorded by meter 42. It will be apparent that if the E. M. F. from power supply 39 is a pulsating direct current, there will also be produced a pulsating current in the liquid in helical conduit 35, thereby inducing a voltage into coil 40 for recording by meter 42. The voltage recorded by meter 42 will be proportional to the potential difference $V_1-V_2$.

From the above description, it is apparent that the present invention provides an apparatus for readily and rapidly measuring the electric potential difference across a body of liquid by producing a variable electric current proportional to the potential difference, producing an electromotive force from this current and measuring this force.

Obviously many modifications and variations of the present invention are possible in the light of the above teachings. It is therefore to be understood, that within the scope of the appended claims, the invention may be practiced otherwise than as specifically described.

What is claimed is:

1. Apparatus for measuring an electrical potential difference across two points in a body of liquid, said apparatus comprising an auxiliary fluid flow path for the liquid between the two points, means in said path for varying the flow therethrough, means electromagnetically coupled to at least a portion of said path for having induced therein an electromotive force proportional to the electric current flow through said path and means connected to the last-named means for indicating the magnitude of said force.

2. Apparatus according to claim 1, wherein the portion of said path to which said last-named means is coupled is of helical form.

3. Apparatus according to claim 2, wherein said last-named means comprises an electric coil closely coupled to said portion of said path.

4. In an apparatus for measuring the electrical potential difference existing across two points in a body of liquid, the combination comprising an auxiliary fluid flow path for the liquid between the two points, means in said path for varying the flow therethrough and means electromagnetically coupled to at least a portion of said path for having induced therein an electromotive force proportional to the electric current flow through said path.

5. In an apparatus for measuring an electric potential difference across two points in a body of liquid, the combination comprising an auxiliary variable fluid flow path for the liquid between the points and means electromagnetically coupled to at least a portion of said path for producing an electromotive force proportional to the electric current flow through said path.

6. Apparatus for measuring an electrical potential difference across two points in a body of liquid, said apparatus comprising an auxiliary fluid conduit for said liquid between the two points, means coupled to said conduit for varying the current flow therethrough so as to produce a variable current therein, means electromagnetically coupled to at least a portion of said conduit for producing an electromotive force proportional to the electric current flow through said conduit.

7. Apparatus for measuring an electrical potential difference across two points in a body of liquid, said apparatus comprising an auxiliary fluid conduit for the liquid between the two points so that there is a current flow in said conduit, means connected to said conduit for varying the current flow therethrough so as to produce a variable current therein, means electromagnetically coupled to at least a portion of said conduit for producing an electromotive force proportional to the variable current in said conduit.

8. Apparatus for measuring an electrical potential difference across two points in a body of liquid, said apparatus comprising an auxiliary fluid conduit for said liquid between said two points so that there is an electric current flow in said conduit, means connected to said conduit for varying said electric current flow to thereby produce a variable current therein, an electric coil closely coupled to a portion of said conduit for having a current induced therein proportional to the variable current in said conduit, and means connected to said coil for recording the current induced therein.

9. Apparatus for measuring an electrical potential difference across two points in a body of liquid, said apparatus comprising an auxiliary fluid conduit for said liquid between said two points so that there is an electric current flow in said conduit, means coupled to said conduit for varying said electric current flow so as to produce a variable current therein, said means including an electric coil closely coupled to a portion of said conduit and a variable current supply, said coil being energized from said variable current supply, the amplitude and frequency of the current produced by the supply being sufficiently large so as to create at least a pulsating current in said conduit, and means electromagnetically coupled to a portion of said conduit for having induced therein an electromotive force proportional to the variable current flow in said conduit.

10. Apparatus as in claim 9 wherein the portions of said conduit with which the first named means and the last named means are coupled are helical in form.

11. Apparatus for measuring an electrical potential difference across two points in a body of liquid, said apparatus comprising an auxiliary fluid conduit for said liquid between the two points so that there is a current flow therein, means associated with said auxiliary conduit producing a variable current flow therein, means electromagnetically coupled to at least a portion of said conduit for producing an electromotive force proportional to the electric current flow through said conduit.

MELVILLE F. PETERS.

REFERENCES CITED

The following references are of record in the file of this patent:

UNITED STATES PATENTS

| Number | Name | Date |
| --- | --- | --- |
| 2,435,043 | Lehde et al. | Jan. 27, 1948 |